(12) United States Patent
Bierhuizen et al.

(10) Patent No.: US 7,845,822 B2
(45) Date of Patent: Dec. 7, 2010

(54) ILLUMINATION DEVICE INCLUDING A COLOR SELECTING PANEL FOR RECYCLING UNWANTED LIGHT

(75) Inventors: Serge J. Bierhuizen, Milpitas, CA (US); Gerard Harbers, Sunnyvale, CA (US)

(73) Assignees: Koninklijke Philips Electronics N.V., Eindhoven (NL); Philips Lumileds Lighting Company, LLC, San Jose, CA (US)

( * ) Notice: Subject to any disclaimer, the term of this patent is extended or adjusted under 35 U.S.C. 154(b) by 433 days.

(21) Appl. No.: 11/618,634

(22) Filed: Dec. 29, 2006

(65) Prior Publication Data

US 2008/0158873 A1 Jul. 3, 2008

(51) Int. Cl.
*F21V 9/00* (2006.01)
(52) U.S. Cl. .................. 362/230; 362/231; 362/235; 362/293
(58) Field of Classification Search .................. 362/19, 362/292, 328, 245, 331, 800, 231, 235, 310, 362/293, 257; 313/112
See application file for complete search history.

(56) References Cited

U.S. PATENT DOCUMENTS

| | | | |
|---|---|---|---|
| 6,341,867 B1 * | 1/2002 | Itoh ........................... 353/20 |
| 6,899,440 B2 | 5/2005 | Bierhuizen |
| 7,040,774 B2 * | 5/2006 | Beeson et al. ................. 362/84 |
| 7,052,152 B2 * | 5/2006 | Harbers et al. ................. 362/30 |
| 7,285,791 B2 * | 10/2007 | Beeson et al. ............ 250/487.1 |
| 7,324,279 B2 * | 1/2008 | Penn ........................... 359/465 |
| 7,352,124 B2 * | 4/2008 | Beeson et al. ............... 313/501 |
| 7,425,794 B2 * | 9/2008 | Adachi ........................ 313/112 |
| 7,520,642 B2 * | 4/2009 | Holman et al. .............. 362/328 |
| 2004/0174692 A1 | 9/2004 | Bierhuizen |
| 2005/0269582 A1 | 12/2005 | Mueller et al. |
| 2006/0187520 A1 | 8/2006 | Bierhuizen |
| 2006/0203483 A1 * | 9/2006 | Rains, Jr. et al. ............ 362/231 |

FOREIGN PATENT DOCUMENTS

| | | |
|---|---|---|
| EP | 1605199 A2 | 12/2005 |
| WO | 03/098329 A1 | 11/2003 |
| WO | 03098329 A1 | 11/2003 |

OTHER PUBLICATIONS

Bachels, Thomas, et al., "Advanced Electronic Color Switch for Time-Sequential Projection", SID Symposium Digest of Technical Papers, vol. 32, Issue 1, pp. 1080-1083.
International Search Report and Written Opinion, 11 pages.

* cited by examiner

*Primary Examiner*—Anabel M Ton

(57) ABSTRACT

An illumination source includes at least one light emitting diode, e.g., in array of LEDs that produce short wavelength light. One or more wavelength converting elements, such as phosphor elements, convert at least a portion of the short wavelength light from the LED(s) to longer wavelengths, such as Red and Green. A dichroic element positioned between the LED(s) and the wavelength converting element (s) transmits the light from the LED(s) and reflects the longer wavelengths from the wavelength converting element(s). A color selection panel selects the colors of light to be produced by the illumination device and to be recycled for another opportunity to be converted by the wavelength converting element(s) or to be reflected by the dichroic element. The color selection panel may operate in one or both of the spatial domain and the temporal domain.

21 Claims, 5 Drawing Sheets

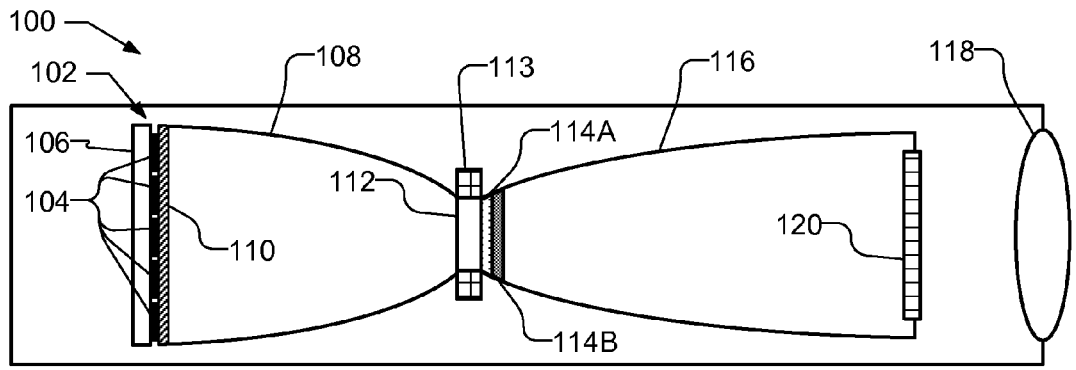
Fig. 1
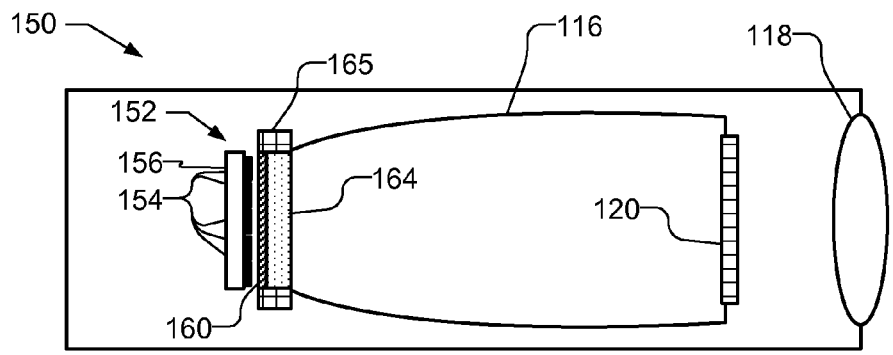
Fig. 2
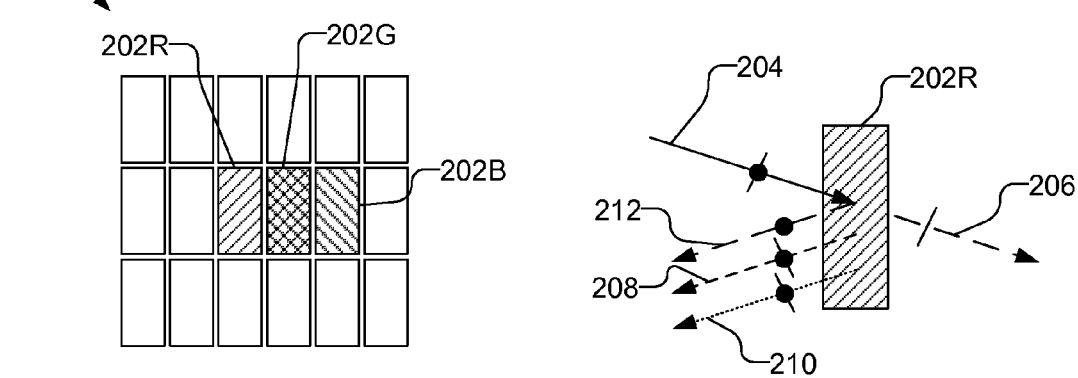
Fig. 3
Fig. 4

ILLUMINATION DEVICE INCLUDING A COLOR SELECTING PANEL FOR RECYCLING UNWANTED LIGHT

FIELD OF THE INVENTION

The present invention is related to a light emitting diode based illumination device.

BACKGROUND

High brightness projection systems typically require an illumination source that has a large volume and high cost. Typical illumination sources use, for example, high pressure mercury lamps or, alternatively, three light emitting diodes (LEDs), i.e., one LED for each color and additional space requirements for dichroic filters to combine the light for single panel systems. There is a desire to reduce the volume and cost of illumination sources, e.g., to be used in compact imaging devices, sometimes referred to as "pocket projectors".

SUMMARY

In accordance with one embodiment of the present invention, an illumination source includes an LED or an array of LEDs, that produce short wavelength light such as Blue light. One or more wavelength converting elements, e.g., phosphor elements, convert at least a portion of the light from the LED(s) to longer wavelengths, such as Red and Green. A dichroic element positioned between the LED(s) and the wavelength converting element(s) transmits the light from the LED(s) and reflects the longer wavelengths from the wavelength converting element(s). A color selection panel selects the colors of light to be produced by the illumination device and to be recycled for another opportunity to be converted by the wavelength converting element(s) or to be reflected by the dichroic element. The color selection panel may operate in one or both of the spatial domain and the temporal domain.

BRIEF DESCRIPTION OF THE DRAWINGS

FIGS. 1 and 2 illustrate illumination devices in accordance within embodiments of the present invention.

FIG. 3 illustrates a plan view of a color selecting panel that operates in the spatial domain and includes a number of individual pixels which transmit Red, Green or Blue light.

FIG. 4 illustrates a close up view of the operation of an individual pixel in the color selecting panel illustrated in FIG. 3.

DETAILED DESCRIPTION

Figure 5:
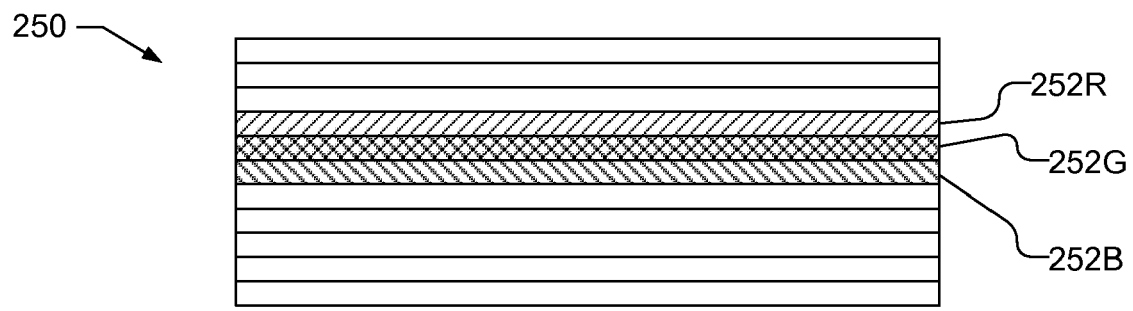
FIG. 5 illustrates a plan view of a color selecting panel that operates in the spatial domain and includes a number of individual stripes, which transmit Red, Green or Blue light.

FIG. 1 illustrates an illumination device 100 in accordance with an embodiment of the present invention. The illumination device 100 is capable of providing uniform illumination and a greater than 50% efficiency gain for single panel projection systems by recycling the light initially rejected by the microdisplay. The illumination device 100 has a compact design (approximately 0.5"×0.5"×1.8" with a 0.5" F#1.8 design) and may reduce costs by using an array of LEDs that produce approximately the same wavelengths (e.g., blue), whereas conventional systems require different types of LEDs to produce the different desired colors of light, e.g., Blue, Green and Red. Moreover, the illumination device 100 has a high brightness due to high recycling efficiency for the light that is not directly used.

As illustrated in FIG. 1, illumination device 100 includes an array 102 of LEDs 104 that produce blue (or other short wavelength) light and which are shown as being mounted on a submount 106 and/or heatsink. The LEDs 104 may include photonic crystals to control the angular emission pattern to concentrate most of the light into a cone that is not greater than e.g., 45°. Alternatively, a compound parabolic concentrator (CPC) or a Right Angle Transformer (RAT) or other similar optical device may be used to control the angular emission pattern of the array 102 of LEDs 104. The use of photonic crystals is advantageous as it reduces the size of the illumination device 100.

The array 102 of LEDs 104 is coupled to an optical concentrator 108, which may be a solid optical concentrator. The optical concentrator 108 includes a dichroic filter 110 at the entrance surface of the optical concentrator 108. The dichroic filter 110 transmits the blue light but reflects longer wavelengths. A ceramic disc 112 is optically coupled to the exit surface of the optical concentrator 108. One or more wavelength converting elements 114A and 114B are deposited on or attached to the ceramic disc 112. The wavelength converting elements 114A and 114B are, e.g., Red and Green phosphors, respectively, or alternatively, a YAG type phosphor. The Red phosphor 114A may be placed before the Green phosphor 114B, i.e., closer to the ceramic disc 112, due to re-absorption of the green emission bands by certain red phosphors such as BSSN. The phosphor plates may be formed into a ceramic disc or, alternatively, the phosphors maybe be applied to a transparent substrate, which does not necessarily need to be ceramic. The order of the wavelength converting elements 114A and 114B plays a role in the recycling path as well. The ceramic disc 112 is transparent to the blue pump light as well as the converted light. A heatsink 113 with an internal reflecting surface may be formed around the ceramic disc 112 and may be used to support the ceramic disc 112 and the wavelength converting elements.

The wavelength converting elements 114A and 114B convert the blue pump light to produce Red and Green light. The thickness of the wavelength converting elements 114A and 114B is adapted so that enough of the Blue pump light is transmitted to create a produce a saturated Red, Green and Blue spectral emission with a good white color balance for the system including the LCD and the projection lens. The wavelength converting elements 114A and 114B emit the converted light in the forward direction as well as the backward direction, i.e., back towards the array 102 of LEDs 104. The dichroic filter 110, however, reflects and thereby recycles the backward emitted converted light.

A collimator 116 is optically coupled to the wavelength converting elements 114A and 114B and receives the Red, Green and Blue spectral emission. A color selecting panel 120 is mounted at the exit of the collimator 116. The color selecting panel 120 may use technology such as transmissive LCD or LCOS that can recycle the unused light. The color selection elements can be integrated into the panel, if desired. The unwanted light may be recycled either in a spatial domain, temporal domain or both. Recyclying in the temporal domain may involve spatial scrolling, as will be discussed below. Recycling significantly increases the output for the Red and Green light. In the case of the Blue light recycling, the pump light will be re-used for additional wavelength conversion of the wavelength conversion elements 114A and 114B, thereby further increasing the brightness of the light transmitted through the display. One or more projection lenses 118 receive and project the light from the panel 120.

As described above, the color selecting panel 120 transmits a desired color and reflects the unwanted light back for recycling. In one embodiment, the color selecting panel 120 generates color over a spatial domain. For example, the color selecting panel 120 may be, e.g., a transmissive LCOS panel, as manufactured by Kopin Corporation of Westboro, Mass. Alternatively, the color selecting panel 120 may use other technologies such as a fast-switching poly-si panel, in which instead of using fixed color filters, the LCD is switched on and off quickly in conjunction with the light source R,G,B to create overlapping Red, Green and Blue images on the projected image.

FIG. 2 illustrates another embodiment of an illumination device 150. Illumination device 150 includes an array 152 of LEDs 154, e.g., on a submount 156. A wavelength converting element 164 converts the Blue pump light to produce Red and Green light and a dichroic filter 160 that is between the array 152 and the wavelength converting element 164 transmits the Blue pump light and reflects the Red and Green light. The wavelength converting element 164 may be may be formed from a ceramic slab, sometimes referred to herein as a "luminescent ceramic". A heatsink 165 with internal reflecting surfaces may be used to support the luminescent ceramic wavelength converting element 164. For more information related to a luminescent ceramic that may be used with the present invention, see U.S. Pub. No. 2005/0269582, which is incorporated herein by reference. A similar illumination device is described in U.S. Ser. No. 11/463,443, entitled "Illumination Device with Wavelength Converting Element Side Holding Heat Sink" by Bierhuizen et al., filed on Aug. 9, 2006, which is commonly owned with the present application and is incorporated herein by reference. Alternatively, one or more wavelength converting elements may be deposited on or attached to a transparent ceramic disc as described in FIG. 1. A collimator 116 is optically coupled to the wavelength converting element 164 and receives the Red, Green and Blue spectral emission. Again, a color selecting panel 120 is mounted at the exit of the collimator 116 and is used to transmit and recycle colors in the one or both the spatial and time domain.

FIGS. 3 and 4 illustrate the operation of a transmissive LCOS panel that is operating as the color selecting panel 120. As illustrated in FIG. 3, a panel 200 is comprised of a number of individual elements or pixels 202, which transmit Red, Green or Blue light. By way of example, FIG. 3 illustrates three pixels which transmit Red light (pixel 202R), Green light (pixel 202G) and Blue light (pixel 202B). The panel 200 is comprised of an array of the Red, Green and Blue pixels.

FIG. 4 illustrates the operation of pixel 202R. As illustrated by solid line 204, pixel 202R receives unpolarized light that contains Red, Green and Blue spectral emissions from the collimator 116. When the pixel 202R is made transmissive, Red light having a single polarization state is transmitted, as indicated by line 206. The unpolarized Green and Blue light is reflected by the pixel 202R as indicated by lines 208 and 210, as is the other polarization states of the Red light as indicated by arrow 212. When pixel 202R is not transmissive, the full spectrum of the incident light is reflected. Thus, pixel 202R continuously recycles the Green and Blue light and recycles a selected polarization state or all polarization states of the Red light depending on whether the pixel 202R is transmissive or not. The Green and Blue pixels 202G and 202B operate in a similar fashion.

As described above, the color selecting panel 120 may be a transmissive LCD. Reflective color filters, such as that manufactured by Ocean Optics of Dunedin, Fla., can be used instead of absorbing filters. By way of example, a scrolling filter may be used, such as that described in U.S. Pub. 2006/0187520, by Bierhuizen, filed May 17, 2002, and published Aug. 24, 2006, which is incorporated herein by reference.

In another embodiment, the color selecting panel 120 may generate color in a stripped color pattern, as opposed to generating color in pixels. As illustrated in FIG. 5, a panel 250 includes a number of individual elements or stripes 202, which transmit Red, Green or Blue light. FIG. 5 illustrates three stripes which transmit Red light (stripe 252R), Green light (stripe 252G) and Blue light (stripe 252B). The panel 250 is comprised of an array of the Red, Green and Blue stripes. The panel 250 generates color over a spatial domain, similar to the panel 200 shown in FIGS. 3 and 4, except the individual color components are a stripe as opposed to a pixel. The stripes 252 in panel 250 include a reflective type color filter that transmits a one color band while other colors are reflected. This embodiment is appropriate, e.g., in a lower cost system, such as pocket-size projectors, as the resolution plays a lesser role and such panels are relatively inexpensive. The reflected light is recycled over the wavelength converting elements 114A and 114B and reflected by dichroic filter 110 and has a another chance to be transmitted through the panel when the light is incident on a pixel of the corresponding color.

Figure 6:
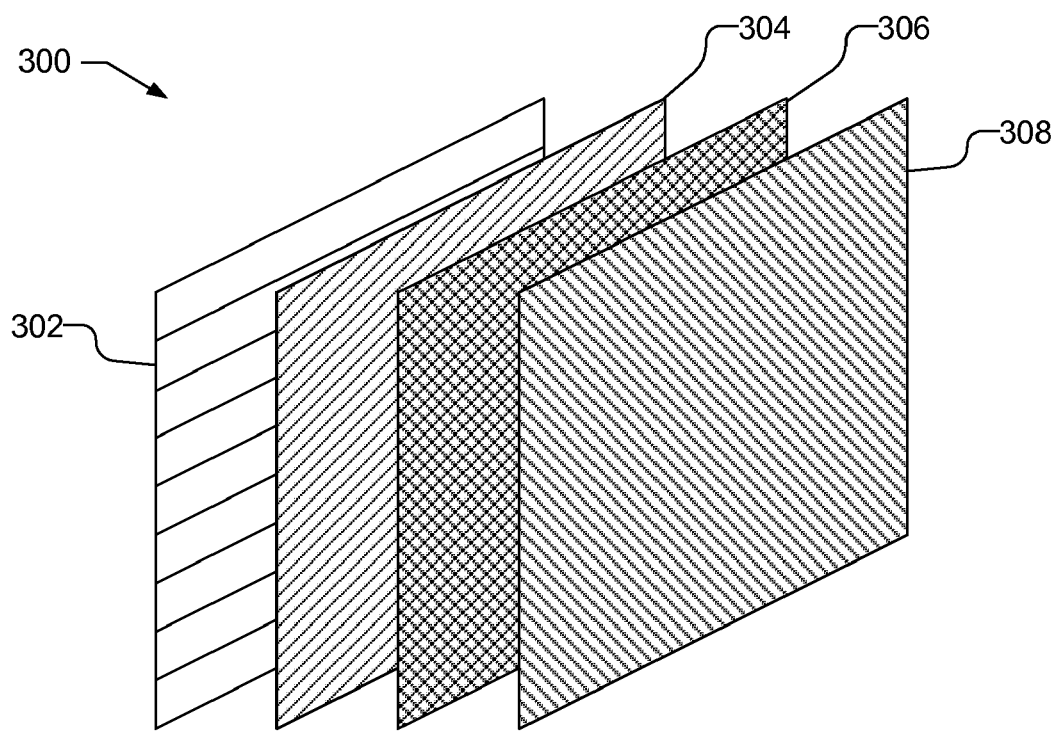
FIG. 6 illustrates an expanded perspective view of a color selecting panel that reflects light of one polarization state and any undesired colors and transmits the desired color and polarization state in the temporal domain.

In another embodiment, the color selecting panel 120 may generate color over a temporal domain, i.e., the color selected to be transmitted varies with time. By way of example, the color selecting panel 120 may be a cholesteric color panel 300, such as that illustrated in an expanded perspective view in FIG. 6, which reflects light of one polarization state and reflects any undesired colors and transmits the desired color and polarization state over the entire color selecting panel 300. The panel 300 includes separate controllable color filters 304, 306, and 308 along with a reflective polarizer 302, such as a wire grid polarizer. Each of the controllable color filters 304, 306 and 308 either transmits a particular color of light while reflecting the other colors, or transmits all colors. By way of example, filter 304 may transmit Red while reflecting Blue and Green, filter 306 may transmit Green while reflecting Red and Blue, and filter 308 may transmit Blue while reflecting Red and Green. Thus, by selecting one of the filters 304, 306, and 308 to transmit its particular color and reflect the other colors and selecting the remaining filters to be transparent, the panel 300 can be controlled to produce Red, Green or Blue light. Moreover, the reflective polarizer 302 transmits only the light having a desired polarization state and reflects the remaining light. Accordingly, the light is recycled based on both color and polarization state.

Generating color over a time domain has the advantage of returning the Blue pump light to the wavelength converting elements 114A and 114B in the period that either Red or Green is turned on, thereby increasing the Red/Green brightness. Moreover, besides switching between saturated Red, Green and Blue color bands, the cholesteric color panel 300 can also be controlled to transmit both Blue and Red/Green (or even Yellow) at the same time, creating a white source for non-saturated images, thereby further increasing the brightness. One color panel that may be used is produced by Rolic Technologies, Ltd. of Allschwil, Switzerland, and described in "Advanced Electronic Color Switch for Time-Sequential Projection" by Bachels et al., SID Symposium Digest of Technical Papers, Vol. 32, Issue 1, pp. 1080-1083.

Figure 7:
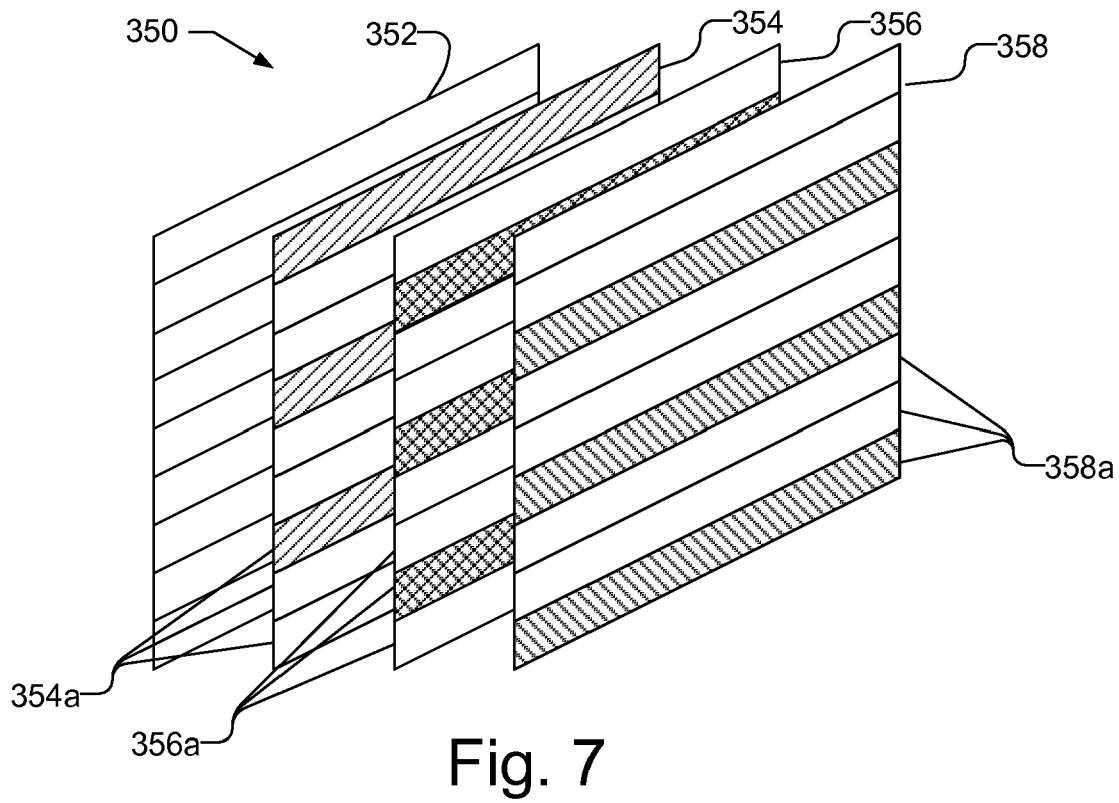
FIG. 7 illustrates an expanded perspective view of a color selecting panel that includes a number of stripes that reflect light of one polarization state and any undesired colors and transmits the desired color and polarization state and that operates in the spatial and temporal domains.
Figure 8:
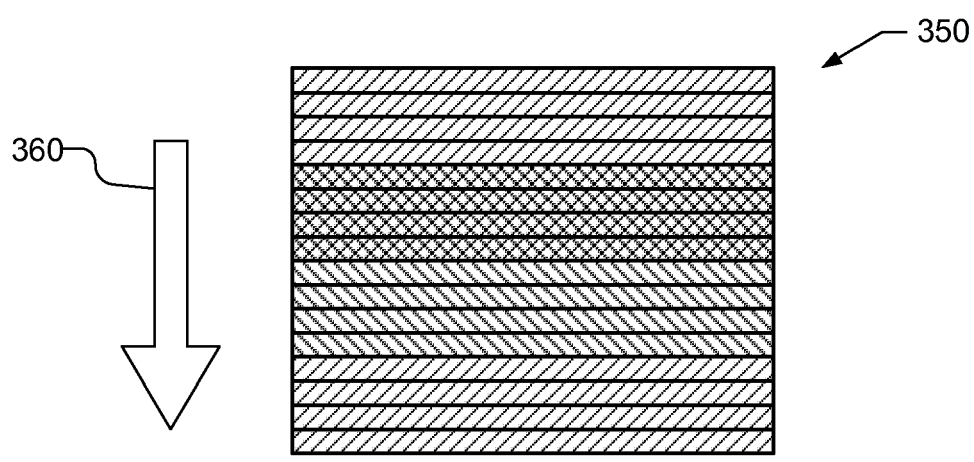
FIG. 8 illustrates a plan view of the color selecting panel of FIG. 7 and shows the combined colors produced by the color selecting panel and how the stripes may be controlled to scroll.

In another embodiment, the color selecting panel 120 may generate color over a combined time and spatial domain. By way of example, the color selecting panel 120 may be a striped cholesteric color panel 350, such as that illustrated in an expanded perspective view in FIG. 7. Panel 350 is similar to panel 300 in FIG. 6, with a reflective polarizer and separate controllable color filters 354, 356, and 358, e.g., for Red, Green and Blue. The controllable color filters 354, 356, and 358, however, each include a number of independently controllable stripes 354a, 356a, 358a that can be controlled to transmit a particular color of light, while reflecting the other colors, or transmits all colors. The stripes may be controlled to scroll so that the individual colors generated by the panel 350 scroll, e.g., downward as illustrated by arrow 360 in FIG. 8, which illustrates a plan view of the panel 350 showing the combined colors generated by color filters 354, 356, and 358. The stripes in the filters 354, 356, and 358 may be controlled so that a number of adjacent stripes in a filter are reflective, as illustrated in FIG. 8, or so that adjacent stripes in a filter are not reflective, as illustrated in FIG. 7.

Thus, the striped cholesteric color panel 350 produces color over a spatial domain as well as a time domain, which is advantageous as it can be used with relatively slow switching single panel technologies while recycling all three colors at the same time. A similar striped color switch is described in WO03098329 and U.S. 2004/0174692, which is incorporated herein by reference. The use of the striped cholesteric color panel 350 with the illumination device 100/150, however, is superior to that described in WO03098329 and U.S. 2004/0174692 because of the use of the array of the same type of LEDs, the wavelength converting elements 114a/114b and the dichroic filter 110, which increase the recycling efficiency.

Figure 9:
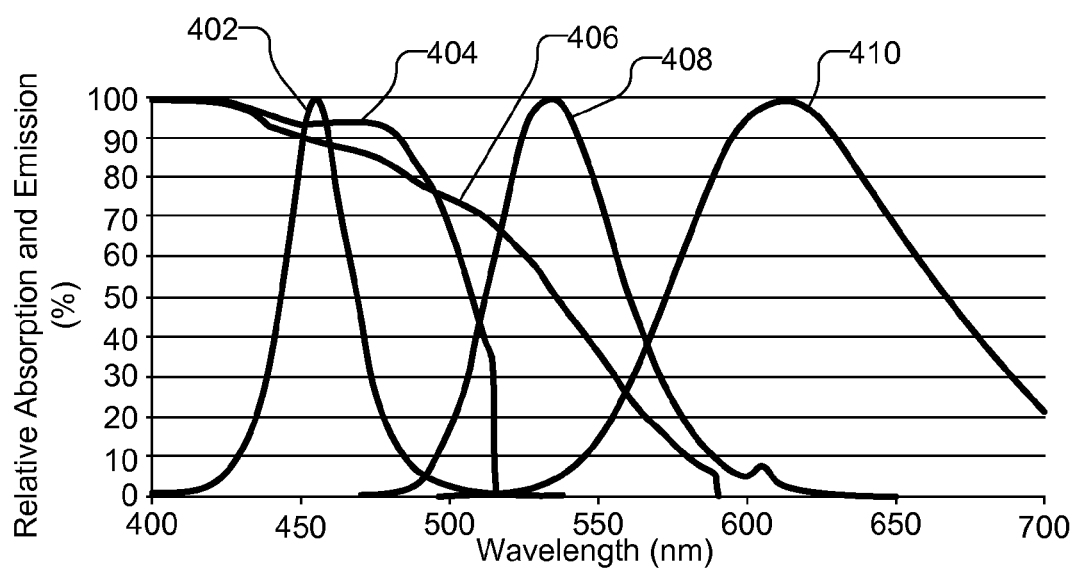
FIG. 9 is a graph that illustrates the spectra of the Blue, Green and Red emissions and Green and Red absorptions from the illumination device.

FIG. 9 is a graph that illustrates the spectra of the Blue 402, the Green emission 408 and Red emission 410, as well as the Green absorption 404 and Red absorption 406 from illumination device 100. The spectral information in FIG. 9 illustrates the phosphor absorption and emission spectral curves and show that the blue light will be mostly absorbed upon recycling and red/green emitted, but that also some of the recycled green light will be absorbed by the red emitting phosphor. Thus, the ratios between Blue light and Red/Green phosphors need to be balanced for the correct system white point after accounting for all recycling/absorption and phosphor (re-) emission factors.

Figure 10:
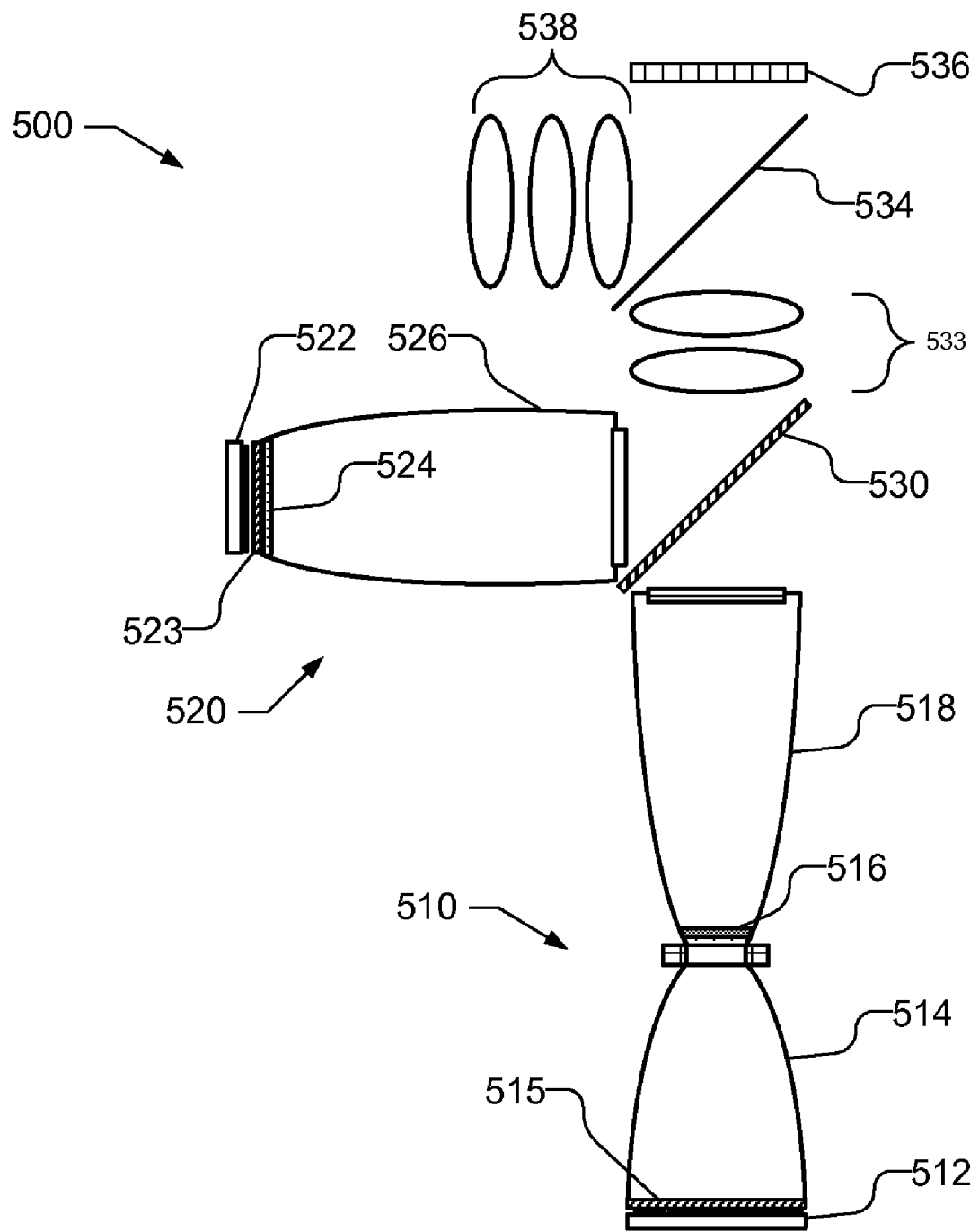
FIG. 10 illustrates another illumination device that uses a five color primary system.

FIG. 10 illustrates another illumination device 500 that uses a five color primary system to enable richer colors and increase brightness. Illumination device 500 includes a Red/Green illumination source 510 and a Cyan illumination source 520. The Red/Green illumination source 510 includes a blue LED array 512, a concentrator element 514 with a dichroic filter 515. A wavelength converting element 516, which may be, e.g., individual Red/Green wavelength converting elements 516 or a combined elements produced of YAG, for example, is positioned between the concentrator 514 and a collimator 518.

The Cyan illumination source 520 includes a blue LED array 522, a dichroic filter 523, a cyan wavelength converting element 524 and a collimator element 526. The Cyan illumination source 520 provides sufficient Blue light to create a good white balance in the light produced. A dichroic filter 530 is positioned between the Red/Green illumination source 510 and the Cyan illumination source 520. Illumination lenses 533 focus the combined light through a reflecting polarizer 534 to a color switch 536, such as an FLC LCOS, to the projection lenses 538. The color switch 536 switch will transmit Blue light in one period, while reflecting the Cyan or vice versa. When the Blue light is recycled, it will create an additional boost in the Cyan converted light.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. An illumination device comprising:
   At least one light emitting diode that produces light having a first range of wavelengths; at least one wavelength converting element converting at least a portion of the light having the first range of wavelengths to light having a second range of wavelengths; and a color selecting panel that selects a portion of the first and/or the second range of wavelength as an illumination light and selects a portion from the first and/or second range of wavelengths as a recycled light, wherein the selection of the illumination light and the recycled light is in at least one of the spatial domain of the panel and the temporal domain of at least two selections.

2. The illumination device of claim 1, further comprising a dichroic element positioned between the array of light emitting diodes and the at least one wavelength converting element, the dichroic element transmitting light having the first range of wavelengths and reflecting light having the second range of wavelengths.

3. The illumination device of claim 1, wherein the at least one light emitting diode is an array of light emitting diodes.

4. The illumination device of claim 1, further comprising:
   a collimator between the at least one wavelength converting element and the color selecting panel.

5. The illumination device of claim 1, further comprising:
   a concentrator element between the at least one light emitting diode and the at least one wavelength converting element.

6. The illumination device of claim 2, further comprising:
   a second at least one light emitting diode;
   a second at least one wavelength converting element converting at least a portion of the light from the second at least one light emitting diode; and
   a second dichroic element positioned to receive and combine the light converted by the at least one wavelength converting element and the light converted by the second at least one wavelength converting element;
   wherein the color selecting panel is positioned to receive the light combined by the second dichroic element.

7. The illumination device of claim 1, wherein the at least one wavelength converting element comprises a wavelength converting ceramic.

8. The illumination device of claim 1, wherein the light having the first range of wavelengths is Blue light and the light having a second range of wavelengths includes Green light and Red light.

9. The illumination device of claim 8, wherein the at least one wavelength converting element comprises a first wavelength converting element that converts at least a portion of the light having the first range of wavelengths to Red light and a second wavelength converting element that converts at least a portion of the light having the first range of wavelengths to Green light.

10. The illumination device of claim 1, wherein a portion of the light to be recycled that has wavelengths within the first range or wavelengths is recycled by being received by the at least one wavelength converting element and being converted to light having the second range of wavelengths and another portion of the light to be recycled that has wavelengths within the second range of wavelengths is recycled by being reflected by the dichroic element.

11. The illumination device of claim 1, wherein the color selecting panel selects the color ranges to produce and the color ranges to recycle in a spatial domain so that different locations on the color selecting panel selects different color ranges to be produced and different color ranges to be recycled.

12. The illumination device of claim 1, wherein the color selecting panel selects the color ranges to produce and the color ranges to recycle in a temporal domain so that the same color range is selected to be produced and the same color range is selected to be recycled at all locations of the color selecting panel at one time and that the color range selected to be produced and the color range selected to be recycled change with time.

13. The illumination device of claim 1, wherein the color selecting panel selects the color ranges to produce and the color ranges to recycle in a spatial domain and a temporal domain so that different locations on the color selecting panel selects different color ranges to be produced and different color ranges to be recycled and that the color range selected to be produced and the color range selected to be recycled at the different locations changes with time.

14. A method of producing light from an illumination source, the method comprising: generating Blue light from at least one light emitting diode; converting at least a portion of the Blue light from the at least one light emitting diode to produce Red light and Green light; and selecting colors of light to produce with a color selecting panel wherein the color selecting panel selects a portion from the Blue, Red or Green light as an illumination light and selects a portion from the Blue, Red or Green light as a recycled light, wherein the selection of the illumination light and the recycled light is in at least one of the spatial domain of the panel and the temporal domain of at least two selections.

15. The method of claim 14, wherein the Blue light is generated from an array of light emitting diodes.

16. The method of claim 14, further comprising transmitting the Blue light through a filter prior to converting at least a portion of the Blue light from the at least one light emitting diode to produce Red light and Green light, wherein the filter reflects the Red light and the Green light.

17. The method of claim 16, wherein when the non-selected color is Blue, the Blue light is recycled by being converted to produce Red light and Green light, and wherein the non-selected color is Red or Green, the Red light or Green light is recycled by being reflected by the filter.

18. The method of claim 14, wherein selecting the color of light to produce is performed in the spatial domain so that the color of light produced by the illumination source varies over space.

19. The method of claim 14, wherein selecting the color of light to produce is performed in the temporal domain so that the color of light produced by the illumination source varies over time.

20. The method of claim 14, wherein selecting the color of light to produce is performed in the spatial domain and the temporal domain so that the color of light produced by the illumination source varies over space and time.

21. The method of claim 14, wherein converting at least a portion of the Blue light from the at least one light emitting diode further produces Yellow light, the method further comprising:
generating Blue light from a second at least one light emitting diode;
converting a portion of the Blue light from the second at least one light emitting diode to produce Cyan light; and
combining the Blue light, Cyan light, Red light, Yellow light and Green light prior to selecting the colors of light to produce from the illumination source.

* * * * *